United States Patent [19]

Katoh et al.

[11] Patent Number: 5,112,659
[45] Date of Patent: May 12, 1992

[54] RABBIT FOR RADIATION

[75] Inventors: Hideo Katoh, Shiroyama; Masahiro Hosoi, Tokyo; Hisashi Hamano, Sagamihara; Yasuhiko Saito, Matsuyama, all of Japan

[73] Assignee: Teijin Limited, Osaka, Japan

[21] Appl. No.: 510,688

[22] Filed: Apr. 18, 1990

[30] Foreign Application Priority Data

Apr. 20, 1989 [JP] Japan .................................. 1-98756
Sep. 29, 1989 [JP] Japan .................................. 1-252326
Oct. 13, 1989 [JP] Japan .................................. 1-264891

[51] Int. Cl.⁵ .................... B27D 22/00; G01N 21/01; C08F 283/04
[52] U.S. Cl. .................... 428/35.7; 525/421; 250/428; 250/432 R; 250/497.1
[58] Field of Search ............ 525/354, 420, 423, 421, 525/419 C, 437 C; 428/187, 16, 35.7; 250/428, 432 R, 497.1, 496.1, 433

[56] References Cited

FOREIGN PATENT DOCUMENTS 1472777 5/1977 United Kingdom .

OTHER PUBLICATIONS

Effects of Ionizing Radiation on Linear Aromatic Polyesters J. Polym. Sci., Polym. Chem. Ed. 21(11), 3083-92 1983 Bell, Vernon; Pezdiritz, George F.
Chemical Abstracts, vol. 82, No. 10, Ouchi et al., 58682h Mar. 10, 1975.
Chemical Abstracts, vol. 107, No. 22, Bode et al., 207011c Nov. 30, 1987.

Primary Examiner—James J. Seidleck
Assistant Examiner—Charles R. Nold
Attorney, Agent, or Firm—Wenderoth, Lind & Ponack

[57] ABSTRACT

A rabbit for radiation formed of an aromatic polyester composed of ethylene-2,6-naphthalenedicarboxylate units as main recurring units and having an intrinsic viscosity of 0.45 to 0.90.

4 Claims, No Drawings

RABBIT FOR RADIATION

This invention relates to a rabbit for radiation of radioactive rays. More specifically, it relates to a sample container (known as a rabbit) for use in exposing various sample substances to radiation in a nuclear reactor or the like.

It is necessary to safely transport samples for radiation safely to an area of radiation such as a nuclear reactor in order to study radiation resistance, chemical reaction changes or physical changes of samples to be exposed to radiation, or to utilize such changes positively. For this purpose, it is the practice to prepare sample containers (rabbits), place the samples in the rabbits, and transfer them through a tube by pneumatically propelling them to an area where the samples are exposed to radiation. When the samples are solid, they may be directly put in the rabbits. When they are liquid or gaseous substances or mixtures of these, they may be first filled in glass or plastic ampoules, and the filled ampoules then may be placed in the rabbits.

In the past, polyethylene has been used as a material for plastic rabbits. The polyethylene rabbit, however, is relatively weak to radiation, and upon radiation, it will be degraded within a relatively short period of time and becomes brittle. Particularly, it cannot withstand use within short periods of time under high dose radiations, for example, irradiation in a nuclear reactor.

Accordingly, there is a need for flexible bag-like rabbits made of a material which is resistant to radiation of radioactive rays in high doses for a long period of time, or can withstand repeated use under these conditions. When a material contained in a rabbit is to be irradiated with neutrons, an element contained in the rabbit might be radioactivated. For this reason, when this substance is taken from the rabbit immediately after radiation and used in another test, its radioactivity causes much inconvenience.

It is an object of this invention therefore to provide a rabbit for radiation.

Another object of this invention is to provide a rabbit for radiation composed of a material having resistance to radiation, especially to radiation in high doses.

Still another object of this invention is to provide a rabbit for radiation composed from a material which is not radioactivated by radiation, and even when radioactivated, its radioactivity decays.

A further object of this invention is to provide an aromatic polyester having certain properties as a material for production of a rabbit for radiation.

Other objects of this invention along with its advantages will become apparent from the following description.

The above objects and advantages of this invention are achieved by a rabbit for radiation, formed of an aromatic polyester composed of ethylene-2,6-naphthalene dicarboxylate recurring units and having an intrinsic viscosity of 0.45 to 0.90.

The aromatic polyester constituting the rabbit of this invention is composed of, as main recurring units, ethylene-2,6-naphthalene dicarboxylate represented by the following formula

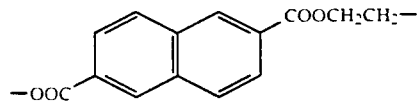

This aromatic polyester contains units of of a dibasic acid other than 2,6-naphthalene carboxylic acid and units of an aliphatic diol as subsidiary recurring units.

Examples of the dibasic acid other than 2,6-naphthalenedicarboxylic acid include such aliphatic or aromatic dicarboxylic acids as oxalic acid, adipic acid, phthalic acid, isophthalic acid, terephthalic acid, naphthalene-2,7-dicarboxylic acid and diphenyl ether dicarboxylic acid.

Examples of the aliphatic diol include ethylene glycol, propylene glycol, trimethylene glycol, tetramethylene glycol, hexamethylene glycol, and neopentyl glycol. Aromatic polyesters in which a hydroxycarboxylic acid such as p-hydroxybenzoic acid or p-hydroxyethoxybenzoic acid is substituted for part of the 2,6-naphthalenedicarboxylic acid may also be used in this invention.

The aromatic polyester used in this invention may be blocked at the terminal hydroxyl groups and or carboxyl groups with a monofunctional compound such as benzoic acid or a methoxypolyalkylene glycol, or may be modified with a polyfunctional compound such as glycerol or pentaerythritol to such an extent that the polyester remains substantially linear. Preferred aromatic polyester used in this invention are homopolymers or copolymers in which at least 90 mole % of the entire recurring units are composed of the ethylene-2,6-naphthalenedicarboxylate recurring units, more preferably a homopolymer of ethylene-2,6-naphthalene dicarboxylate and copolymers comprising at least 95 mole % of the above units.

If the aromatic polyester used in this invention is a copolymer, the aromatic polyester preferably contains at most 10 mole %, more preferably at most 5 mole %, of recurring units of a dibasic acid component other than 2,6-naphthalenedicarboxylate and recurring units of an aliphatic diol component in addition to the 2,6-naphthalene dicarboxylate units as main recurring units.

The aromatic polyester used in this invention has an intrinsic viscosity, determined in a mixture of tetrachloroethane and phenol in a weight ratio of 6:4 at 35° C., of 0.45 to 0.90, preferably 0.55 to 0.70. The aromatic polyester used in this invention may be prepared by a known method, such as direct polymerization or ester-interchange, from 2,6-naphthalene dicarboxylic acid or its ester-forming derivative, an aliphatic diol or its ester-forming derivative, and as required, a third component. For example, it may be produced by performing ester-interchange of 2,6-dimethylnaphthalene carboxylate using ethylene glycol in a reaction vessel in the presence of a catalyst under atmospheric pressure or an elevated pressure, and subjecting the product to polycondensation under reduced pressure to give a polymer; or by subjecting 2,6-naphthalene dicarboxylic acid and ethylene glycol to direct esterification in the presence of a catalyst under atmosphereic pressure or an elevated pressure, and polycondensing the resulting product under reduced pressure to give a polymer. Various known catalysts may be used as the catalyst in the above methods. Examples of the especially preferred catalyst are titanium carboxylates, such as tetrabutyl titanate, or reaction products between trimellitic acid or hemimellitic acid and titanium tetrabutoxide. Since titanium compounds have high polymerization activity, they can be used in smaller amounts than other polymerization catalysts. Hence, the resulting aromatic polyester advantageously has weak radioactivation by radiation.

The aromatic polyester used in this invention is preferably one that is obtained by polymerization using the titanium compounds as catalysts. Accordingly, aromatic polyesters containing at most 50 ppm of titanium as a metal impurity and being substantially free from metal impurity other than titanium are especially preferred. The rabbit of this invention for radiation can be molded from the aromatic polyester by known molding methods.

For example, the aromatic polyester is heated to a temperature of 280 to 310 °C. The molten polyester is injected into a mold, and cooled and solidified. This method can give a molded article in which at least a part of the container wall is substantially non-oriented, for example, a cylindrical container having an outside diameter of 15 to 20 mm, a length of about 60 to 80 mm, and a thickness of about 1.5 to 2 mm may be obtained. A substantially non-oriented container wall composed of the aromatic polyester in such a molded article has a density of preferably lower than 1.345 g/cm$^3$, preferably lower than 1.340 g/cm$^3$. Such a molded article having a low density or a low crystallinity has the advantage that its radioactivation by radiation is weak.

The rabbit for radiation in accordance with this invention can be produced as having an oriented container wall by a known method such as a blow stretching method, a tubular stretching method or a flat film method. Stretching is suitably carried out at the glass transition point (Tg) of the aromatic polyester to a temperature 30° C. above Tg, for example at 115 to 145° C. Usually, the stretching is carried out at a stretch ratio of 6.3 to 40 times in terms of area ratio. After stretching, the film is heat-set preferably at a temperature of, for example, 150 to 255° C.

The rabbit may be produced by forming the stretched molded product obtained by the above method into a cylindrical or bag-like container by heat sealing or bonding. To produce a bag-like container, a heat sealing method or melt welding sealing method is preferably applied.

The container wall composed of the stretched and oriented film obtained by the above method has a planar orientation index of 0.10 to 0.28, and a density of 1.345 to 1.360 g/cm$^3$. If its planar orientation index is less than 0.10, it does not have sufficient radiation resistance when it is radiated for a long period of time. If its planar orientation index exceeds 0.28, the oriented film is undesirably liable to tearing.

If its density is lower than 1.345, it has inferior heat resistance and tends to be deformed by heat during radiation. The rabbit composed of the stretched film is produced, for example, as a cylindrical container having an outside diameter of 15 to 20 mm, a length of 50 to 80 mm, and a thickness of 5 to 100 micrometers.

The rabbit of this invention for radiation has the following advantages.

1. Since it undergoes markedly less degradation than a known rabbit composed of polyethylene, it can be used under radiation in high doses. It is particularly suitable as a rabbit for radiation in a nuclear reactor.

2. When it is radioactivated, its radioactivity decays very greatly. Hence, its handling after radiation of a sample becomes very easy.

3. Since it does not become brittle at low temperatures, for example at the temperature of liquid nitrogen, it can be used in a cryogenic environment.

4. Since it is oriented and heat-treated the rabbit of the invention can be used at high temperatures of, for example, up to about 250 °C.

The following examples illustrate the present invention.

The properties in the following examples were measured by the following methods.

(A) Intrinsic viscosity

It is calculated from the value measured at 35 °C. in a mixture of tetrachloroethane and phenol in a weight ratio of 6:4.

(B) Density

A small piece was cut out from the molded product to prepare a sample for density measurement. The density of the sample was measured by using a density gradient tube containing a mixture of carbon tetrachloride and n-heptane.

(C) Measurement of refractive index and calculation of the planar orientation index.

Using a sodium D line (589 nm) as a light source, the refractive index was measured at a temperature of 25 o and a relative humidity of 65 %, and methylene iodide may be used as a mounting liquid.

In the case of a flat film; its refractive index was measured in the longitudinal direction, the lateral direction and the thickness direction. Let the indices of the film be $n_M$, $n_T$ and $n_Z$, the planar orientation index was calculated as $(n_M+n_T)/2 - n_Z$. If the film was obtained by blow stretching or tublar stretching, the angular distribution of the refractive index within the film plane was measured, and a value obtained by subtracting the diffractive index in the thickness direction from the average value of these is defined as the planar orientation index.

(D) Test of radioactivity resistance

Test pieces were prepared from PEN-2,6 and polyethylene as a comparative material, and bag-like rabbits were prepared from these materials. By using a pneumatic feeding tube made by Japan Atomic Energy Laboratory, Neutron fluxes of radiation holes were radiated at $5.5 \times 10^{13}$ to $8.0 \times 10^{13}$ n/cm$^2$-sec. The radioactivities of the test pieces radiated with neutrons were measured by an ionizing box-type dose rate meter (IC-247) or a GM dose rate meter. In Examples 1 and 2 and Comparative Examples 1 and 2, the exposure dose rate was 200 Mrad/hr.

(E) Impact Test

Test pieces were prepared in accordance with JIS K-7111, and subjected to an impact test by using a Charpy impact tester made by Toyo Seiki Co., Ltd.

EXAMPLES 1 AND 2 COMPARATIVE EXAMPLES 1 and 2

Three PEN-2,6 samples having different intrinsic viscosities were prepared. They were each melted at 300 °C., and extruded into a mold maintained at 60 °C. Thus, cylindrical rabbits were prepared each of which had a thickness of 1.5 mm, an inside diameter of 15 mm and a length of about 80 mm (Examples 1 and 2 and Comparative Example 1).

On the other hand, commercial polyethylene (Marlex 50) having a melt index of about 5 was melted at 180°

C., and molded into a rabbit of the same shape as above by the same methods as described above (Comparative Example 2).

These rabbits were sent to a radiation section of a nuclear reactor and exposed for a certain period of time at predetermined doses. Then, they were taken out, and crushed strongly by fingers. The degree of embrittlement was evaluated. The results are shown in Table 1.

TABLE 1

| Run | Intrinsic viscosity | Density of the rabbit (g/cm$^3$) | Radioactive ray resistance |
|---|---|---|---|
| Comparative Example 1 | 0.40 | 1.335 | By radiating for 2 hours, the rabbit become brittle. |
| Example 1 | 0.50 | 1.334 | By radiating for 6 hours, the rabbit did not become brittle |
| Example 2 | 0.70 | 1.334 | Even when the rabbit was exposed for 6 hours to radiation, it did not become brittle |
| Comparative Example 2 | — | 0.96 | The rabbit became brittle by irradiation for 40 minutes, and could not be used for a longer time. |

Table 1 clearly shows that the rabbits of the invention shown in Examples 1 and 2 had very good resistance to radiation, and were useful for radiation.

EXAMPLE 3 AND COMPARATIVE EXAMPLE 3

Poly(ethylene-2,6-naphthalene dicarboxylate) containing 15 ppm of titanium and being substantially free from other impurities was prepared.

The polyethylene-2,6-naphthalene dicarboxylate was melted at 300° C. and extruded into a mold kept at a predetermined temperature to prepare a test piece with a notch which had a thickness of 3.2 mm, a width of 13 mm and a length of 65.4 mm.

Commercial polyethylene (Marlex 50) having a melt index of about 5 was melted at 190° C. and molded into a test piece of the same shape by the same method as above.

These test pieces were sent to a radiating section of a nuclear reactor and exposed for a predetermined time to radiation at a predetermined dose, and then subjected to various tests.

The results are shown in Table 2.

TABLE 2

| | Properties of the test pieces | | | Impact value (kg cm/cm$^2$) | | | | |
|---|---|---|---|---|---|---|---|---|
| Run | Impurity | Intrinsic viscosity | Density | Unradiated | After 40 minutes radiation 1.9 × 10$^{17}$ | After 3 hrs radiation 5.9 × 10$^{17}$ | After 6 hrs radiation 1.3 × 10$^{18}$ | After 12 hrs radiation 2.6 × 10$^{18}$ |
| Example 3 | titanium 15 ppm | 0.58 | 1.335 | 4.85 | 4.98 | 4.80 | 4.80 | 4.10 |
| Comparative Example 3 | Polyethylene | | | — | Became brittle after radiation for 40 minutes | | | |

| | | Dose rate (R/hr) | | | |
|---|---|---|---|---|---|
| Run | | After 40 minutes radiation 1.9 × 10$^{17}$ | After 3 hrs radiation 5.9 × 10$^{17}$ | After 6 hrs radiation 1.3 × 10$^{18}$ | After 12 hrs radiation 2.6 × 10$^{18}$ |
| Example 3 | | 0.10 | 0.08 | 0.06 | 0.06 |
| Comparative Example 3 | | 0.10 | 0.10 | 0.10 | 0.10 |

The materials (test pieces) for rabbits described in Example 3 showed a little reduction in impact test value even at high radiation doses, and decayed greatly in dose rate. They therefore sufficiently withstood practical use.

The polyethylene test piece shown in Comparative Example 3 had the defect that the material became brittle within a very short period of time, although the dose rate of radioactive rays decayed greatly.

A rabbit was prepared from the material having the properties shown in Example 3, and irradiated in a nuclear reactor with 2.6 × 10$^{18}$ neutrons. It was found that the rabbit could be used for practical purposes without become brittle.

EXAMPLE 4

PEN-2,6 containing 15 ppm of titanium but being substantially free from other impurities was synthesized. This PEN-2,6 was melt-extruded into a sheet and cooled to prepare a non-stretched film. The non-stretched film was then stretched to 3.6 times both in the longitudinal and transverse directions, and heat-set for 30 minutes under tension at 230° C. to give a biaxially oriented film having a thickness of 9 micrometers. This film had an intrinsic viscosity of 0.57, a planar orientation index of 0.25 and a density of 1.354.

The results are shown in Table 3.

TABLE 3

| | Properties of the rabbit | | | | Tear resistance (kg/mm) | | Dose rate (R/hr) |
|---|---|---|---|---|---|---|---|
| | Impurity | Intrinsic viscosity | Planar orientation index | Density | Unradiated | After 6 hrs radiation 1.3 × 10$^{18}$ | After 6 hrs radiation 1.8 × 10$^{18}$ |
| Example 4 | titanium 15 ppm | 0.57 | 0.25 | 1.354 | 0.17 | 0.15 | 0.06 |

The rabbit shown in Example 4 did not decrease in tear resistance even at a high radiation dose, and the radiation dose rate decayed greatly. It could sufficiently withstand practical used.

We claim:

1. A rabbit for radiation formed of an aromatic polyester composed of ethylene-2,6-naphthalene dicarboxylate units as main recurring units and having an intrinsic vicosity of 0.50 to 0.70, in which the aromatic polyester contains at most 50 ppm of titanium as a metal impurity and is substantially free from a metal impurity other than titanium, and wherein the rabbit has a container wall in which at least a part of the container wall is substantially non-oriented and has a density of lower than 1.345 g/cm$^3$.

2. A method of exposing a sample to radiation, which comprises inserting the sample in a rabbit and irradiating the sample, wherein the rabbit is formed of an aromatic polyester composed of ethylene-2,6-naphthalene dicarboxylate units as main recurring units and having an intrinsic viscosity of 0.50 to 0.70, in which the aromatic polyester contains at most 50 ppm of titanium as a metal impurity and is substantially free from a metal impurity other than titanium, and wherein the rabbit has a container wall in which at least a part of the container wall is substantially non-oriented and has a density of lower than 1.345 g/cm$^3$.

3. The rabbit of claim 1 in which at least 90 mole % of the entire recurring units of the aromatic polyester is composed of ethylene-2,6-naphthalene dicarboxylate units.

4. The rabbit of claim 1 in which the aromatic polyester contains at most 10 mole % of recurring units of a dibasic acid other than 2,6-naphthalene dicaroxylic acid and recurring units of an aliphatic diol in addition to ethylene-2,6-naphthalene dicarboxylate as main recurring units.

* * * * *